April 15, 1930.  F. W. WILT  1,754,409
DOUBLE DECKED SEMITRAILER
Filed June 13, 1927   2 Sheets-Sheet 2
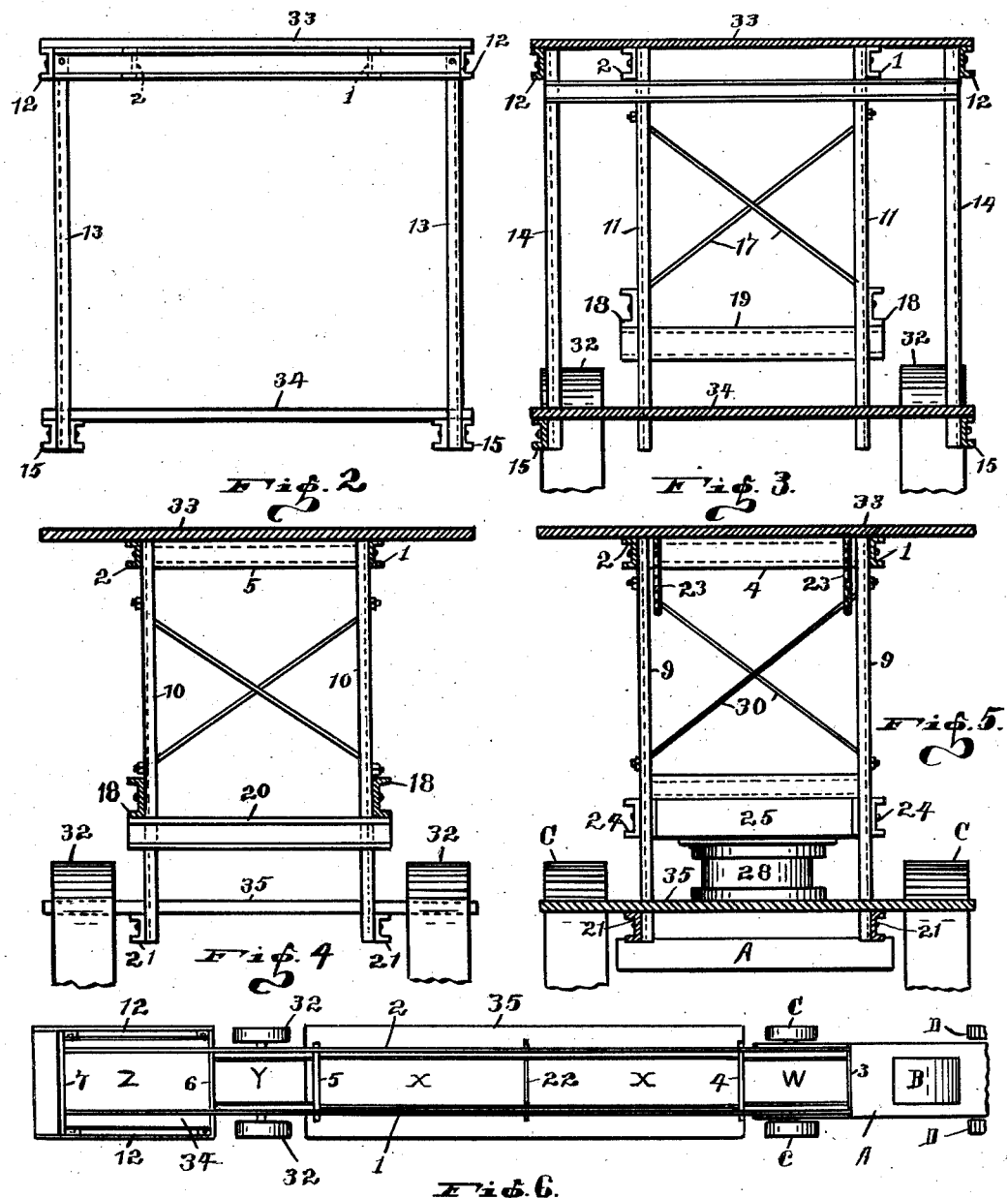

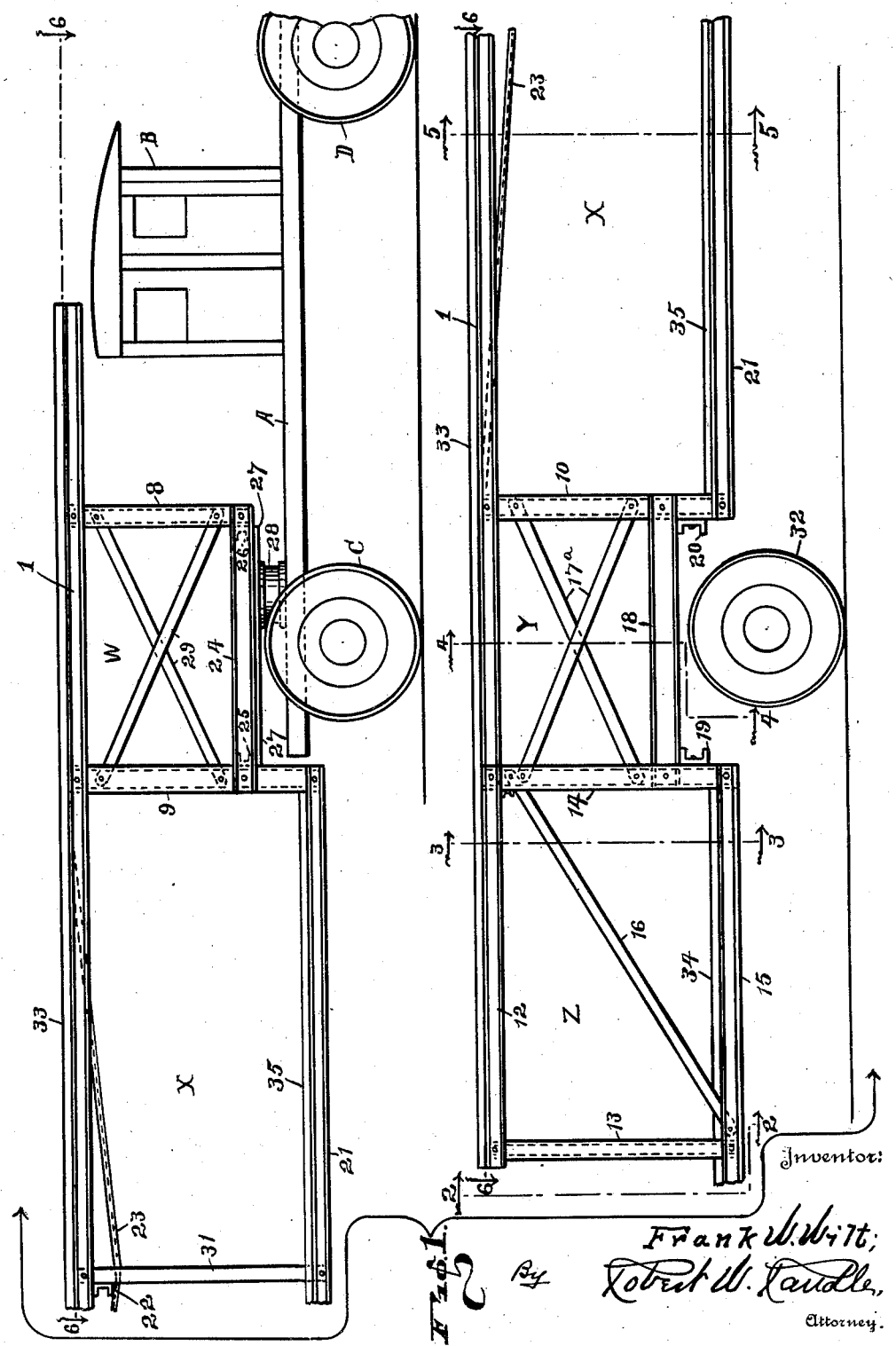

Patented Apr. 15, 1930

1,754,409

UNITED STATES PATENT OFFICE

FRANK W. WILT, OF PORTLAND, INDIANA

DOUBLE-DECKED SEMITRAILER

Application filed June 13, 1927. Serial No. 198,450.

The object of my present invention, broadly speaking, is to provide a semi-trailer to be employed in connection with a truck, or other motor vehicle, and it is intended more especially to carry loads which are comparatively light in weight but of large volume, such for instance as automobile bodies, but also being applicable to carry other kinds of freight.

Heretofore trailers for carrying said particular kind of freight have been used but they provided for but one horizontal row of such freight, and to increase the capacity thereof the trailer was made of great length, which it is not now practical to increase, for the reason that it would be objectionable in many respects, as, for instance, in turning sharp corners, interfering with traffic, and requiring a great amount of road space for their operation.

The particular object of this invention is to overcome said objections by providing a double-decked trailer, which will occupy but a minimum amount of space, and which will carry a greater number of such bodies, or other freight, than heretofore has been carried even by an extremely long trailer.

Still more particularly stated, my object is to provide a double decked semi-trailer having new and novel features of construction and arrangement, such as a metal framework forming a skeleton thereof, with the members of the frame-work rigidly secured together, permitting articles of merchandise to be carried endwise or sidewise, or both, and having trusses for supporting the central portion thereof in suspension, and various other features which will be brought out in the course of the following detailed description.

In order that the construction and the several advantages of my invention may be better understood and appreciated, I will now take up a detailed description thereof, in which I will set forth the same as fully and as comprehensively as I may.

The preferred means for carrying out the principles of my invention in a practical, economical, and efficient manner is shown in the accompanying two sheets of drawings, in which—Figure 1 is a side elevation of my entire construction in connection with a portion of a truck; this view being broken into two parts, in order that the various members may be made on a scale such as to clearly show the various elements of the invention. Figure 2 is a rear end elevation, as taken on the line 2—2 of Fig. 1. Figure 3 is a cross section, as taken on the line 3—3 of Fig. 1. Figure 4 is a cross section, as taken on the line 4—4 of Fig. 1. Figure 5 is a cross section as taken on the line 5—5 of Fig. 1. And Figure 6 is a plan view of the frame, showing the parts as they would appear with the upper deck removed, that is to say—on the line 6—6 of Fig. 1.

Similar indices denote like parts throughout the several views.

In the drawings letter A denotes the platform or body of a truck and on the front portion of which is mounted the driver's cab B. Said truck has the usual drive-wheels C, and the front or guiding wheels D. Other portions of the truck are of usual construction, and they are immaterial to an understanding of my invention.

The invention proper comprises a skeleton frame-work formed entirely of metal, with the main parts thereof formed of channel-iron.

The skeleton frame may, for convenience of description, be divided into four sections, which are denominated as sections W, X, Y and Z.

Said frame-work comprises the two upper bars 1 and 2, which are parallel with each other, and they extend the full length of frame-work, that is throughout all of said sections.

The members 1 and 2 are connected by the cross-bars 3, 4, 5, 6 and 7. Extending down from each end portion of each of said cross-bars, except the cross-bar 7, are the vertical posts 8 from cross-bar 3; posts 9 from the cross-bar 4; posts 10 from the cross-bar 5; and posts 11 from the cross-bar 6.

Section Z: The cross-bars 6 and 7 are of greater length than the other cross-bars, and their ends are connected by a bar 12 on each side, the same being parallel with the members 1 and 2, but are spaced outwardly therefrom, as shown in Fig. 6. Numeral 13 denotes the two vertical posts which extend down from the rear ends of the bars 12. Also extending down from the forward ends of the bars 12 are the vertical posts 14. On each side the lower ends of the posts 13 and 14 are connected by the side-bars 15. On each side a supporting brace 16 extends at an angle from the upper portions of the posts 14 to near the lower ends of the posts 13, where they are secured to the respective bars 15. The parts 11 are connected by the crossing braces 17, simply to give the frame rigidity; and like braces 17ª connect the posts 10 and 11 on each side.

Section Y: The posts 10 and 11, on each side, are connected by the bottom rails 18. Likewise the posts 11—11 are connected by a bottom rail 19; and the posts 10—10 are connected by a bottom rail 20. The side rails 18 rest on the rails 19 and 20, and they are on a higher level than the rails 15, to provide wheel spaces.

Section X: Numeral 21 denotes the two bottom side rails of the main or long section, X, of the device, and they are on the same level as the members 15, and their rear ends are secured to the lower ends of the posts 10, while their forward ends are secured to the lower ends of the posts 9. Across the middle of the long section X is a cross bar 22, which connects the members 1 and 2.

Truss-rods 23 extend between the posts 9 and 10, on each side, with their central portions extending under the cross-bar 22, whereby the central portion of section X is suspensionally supported in its center.

A detachable post 31 is located on each side and connecting the bars 1, and 2, with the rails 15, but they may be temporarily removed for loading or unloading the trailer. By means of the detachable posts 31 the main section X may be divided into two sub-sections.

Section W: Extending from the posts 9 to the posts 8 are the horizontal rails 24, which are on the same level as are the rails 18.

Extending across and connecting the lower portions of the posts 9 is a cross-bar 25. Likewise connecting the posts 8 is a cross-bar 26. Secured to the underside of the bars 24, and to the bars 25 and 26, and covering the space therebetween, is a plate 27, to the underside of the center (crosswise) of which is attached one member of the fifth-wheel or pivot 28, the other member of said pivot being secured on the surface of the platform A of the truck. However in place of the plate 27 the pivot 28 may be secured to auxiliary cross-bars attached to members 24, 25 and 26.

Connecting the posts 8 and 9 are the crossing braces 29, on each side. Like braces 30 connect the posts 8—8 and also the posts 9—9.

The rear portion of the trailer is supported on the ground wheels 32 which are located below section Y, and to provide proper space therefor is the reason for making section Y of less height than are sections Z and X. Likewise section W is made of less height than sections Z and X in order to provide space for the wheels C of the truck, and also to elevate the bottom of space W above the platform A of the truck, thereby making the bottoms of sections Z and X lower than the platform A of the truck.

It should be noticed that the members 1 and 2 project forward beyond the posts 8, that is beyond section W, in order to make the upper deck longer and therefore to provide more space thereon.

Covering the entire framework, above described, extending from end to end of members 1 and 2, and projecting outward at the sides thereof, is the upper deck 33, which may be of wood or metal.

Said upper deck is formed flat and it is on the same level throughout its extent.

The lower deck consists of two spaced apart sections: the lower deck section 34, resting on the members 15 and forming the floor of section Z; and the lower deck section 35, resting on the members 21 and forming the floor of section X. All of said deck-sections, 33, 34 and 35, are rigidly secured to said frame-work. The width of the lower deck and of the upper deck is substantially the same, although they may be of different widths if desired.

With the several members of the trailer assembled, and connected with a truck, all as shown in Figs. 1 and 6, the trailer will be ready to receive its load.

Assuming that the trailer is to carry automobile bodies: One of such bodies may be placed on the deck 34, in section Z, the same being entered endwise and pushed in from the rear end of the trailer, that is—from the end shown in Fig. 2.

In section X a number of such bodies may be placed lengthwise, the same being inserted from either side of the trailer, resting them on the deck 35. It being understood that either one or both of the posts 31 may be removed to facilitate the placing of such bodies. Also a still greater number of such bodies may be placed on the deck 33, as the full length thereof may be utilized for that purpose, placing them lengthwise or crosswise thereof. If the bodies are placed crosswise then they will project out on each side beyond the deck 33, but there will be no objection thereto as it will not interfere with traffic as they will be above, or on a higher level than an ordinary automobile which may be passed upon the highway.

In conveying automobile bodies the space in sections W and Y will not be utilized therefor, but they may be employed for other freight.

Ordinarily automobile bodies are carried on a single deck trailer, and unless the roadway is sufficiently wide they can not be placed crosswise of the trailer without interference with other traffic. But with my construction, herein set forth, said bodies may be placed endwise on the lower deck and crosswise on the upper deck and still allowing the trailer to function on an ordinary width roadway, or even on a narrow roadway, as the load will have no greater width, where it might interfere with passing vehicles, than an ordinary truck with the automobile bodies placed endwise.

By means of my construction I am able to almost double the capacity of the trailer without increasing the length thereof, and also accomplishing the various objects hereinbefore enumerated.

I desire that it be understood that various changes may be made in the several details herein set forth without departing from the spirit of my invention and without sacrificing any of the advantages thereof which are new and useful.

Having now fully shown and described my invention, what I claim, and desire to secure by Letters Patent of the United States, is—

In combination with a truck, a double-decked semi-trailer to be drawn and partly supported thereby, said trailer consisting of a front minor section, a central main section, a rear minor section, and a rear main section, including two spaced apart upper channeled-bars extending the full length of all of said sections together and projecting forward beyond the front section, cross-bars connecting said upper bars at the points of termination of each of said sections, certain of said cross-bars being of greater length than the others and projecting outwardly beyond the two upper channeled bars, posts extending down from each end portion of each of said cross-bars, main lower side bars connecting the lower ends of each pair of said posts on each side of the trailer and forming the lower parts of the main central section and the main rear section, auxiliary side-bars connecting the posts of each minor section and located on a higher plane than the lower side-bars of the said main sections, a single brace for each side of the main rear section, a pair of crossing braces for each side of each of the two minor sections, a removable vertical post on each side of the main central section and located in the center, longitudinally, thereof, ground wheels mounted underneath the rear minor section, means for pivotally mounting the minor front section on the truck, a floor for the lower part of the rear section, a floor for the lower parts of the main section, said two floors forming the main deck, and an upper deck extending over all of the sections and projecting forward from the front minor section and projecting out at each side beyond all of said sections, substantially as shown.

FRANK W. WILT.